United States Patent [19]

Chuang

[11] Patent Number: 5,435,471
[45] Date of Patent: Jul. 25, 1995

[54] ARTICLE CARRIER FOR BICYCLE

[76] Inventor: Louis Chuang, 11th Floor-1, No. 367, Gong Yi Road, Taichung, Taiwan

[21] Appl. No.: 246,994
[22] Filed: May 20, 1994
[51] Int. Cl.⁶ .................................................. B62J 9/00
[52] U.S. Cl. ................................. 224/39; 224/32 A; 224/32 R
[58] Field of Search .............. 224/32 A, 30 A, 30 R, 224/39, 32 R, 41, 42, 33 R, 36

[56] References Cited

U.S. PATENT DOCUMENTS

| | | | |
|---|---|---|---|
| 680,213 | 8/1901 | Baker et al. | 224/36 |
| 2,776,790 | 1/1957 | Zbikowski | 224/39 R |
| 2,914,285 | 11/1959 | Audette | 224/42.03 R |
| 3,937,374 | 2/1976 | Hine, Jr. | 224/32 A |
| 4,096,980 | 6/1978 | Clow | 224/32 A |
| 4,460,114 | 7/1984 | Grenier | 224/32 A |
| 4,516,705 | 5/1985 | Jackson | 224/32 A |
| 4,577,786 | 3/1986 | Dowrick et al. | 224/32 A |
| 4,671,438 | 6/1987 | La Plante | 224/32 A |
| 5,024,359 | 6/1991 | Thomas | 224/36 |
| 5,044,588 | 9/1991 | Gunter | 224/30 A |
| 5,332,183 | 7/1994 | Kagayama | 224/30 A |
| 5,375,748 | 12/1994 | Katz | 224/41 |

FOREIGN PATENT DOCUMENTS

| | | | |
|---|---|---|---|
| 66481 | 3/1948 | Denmark | 224/32 |
| 477010 | 3/1992 | European Pat. Off. | 224/32 A |
| 86013 | 6/1955 | Norway | 224/42 |
| 584835 | 1/1947 | United Kingdom | 224/32 A |
| 614967 | 12/1948 | United Kingdom | 224/32 A |
| 670466 | 4/1952 | United Kingdom | 224/39 |

Primary Examiner—J. Casimer Jacyna
Assistant Examiner—Gregory M. Vidovich
Attorney, Agent, or Firm—Charles E. Baxley

[57] ABSTRACT

A carrier includes a beam fixed to an article, such as a pannier for attaching the article to a bicycle. Two hooks are secured to the beam for hooking to the bicycle. A base is fixed on the beam and has a track fixed on the top. A slide is slidably engaged on the track and has a retainer secured on the top for engaging with the bicycle so as to solidly secure the beam to the bicycle.

5 Claims, 3 Drawing Sheets

ARTICLE CARRIER FOR BICYCLE

BACKGROUND OF THE INVENTION

1. Field of the Invention

The present invention relates to an article carrier, and more particularly to a pannier carrier for bicycles.

2. Description of the Prior Art

Typically, a presser foot is provided in the bicycle rear rack and biased to press against an object by a spring element so as to retain the object in place. Normally, bags or luggages are also retained in place by the presser foot. However, typical bags have soft configuration and may not be easily retained in place, such that the bags should further be wrapped in place by ropes. This is inconvenient.

The present invention has arisen to mitigate and/or obviate the afore-described disadvantages of the conventional article carriers.

SUMMARY OF THE INVENTION

The primary objective of the present invention is to provide an article carrier which may be solidly secured to the bicycle, particularly the rear rack of the bicycle.

In accordance with one aspect of the invention, there is provided a carrier for attaching an article to a bicycle. The carrier comprises a beam for fixing to the article; two hooks secured to the beam for hooking to the bicycle; and a retaining means secured to the beam for engaging with the bicycle so as to retain the beam on the bicycle.

The beam includes a dove-tail cross section and includes two oblong holes formed therein, the hooks each includes a dove-tail shaped recess formed therein for slidably engaging with the beam, and a bolt engaged through the hooks and the oblong holes of the beam for fixing the hooks to the beam.

The retaining means includes a base fixed on the beam, a track fixed on the base, a slide slidably engaged on the track, and a retainer secured on the slide for engaging with the bicycle when the slide moves along the track, whereby, the beam is solidly secured to the bicycle. The retainer includes a knob provided thereon for moving the slide.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
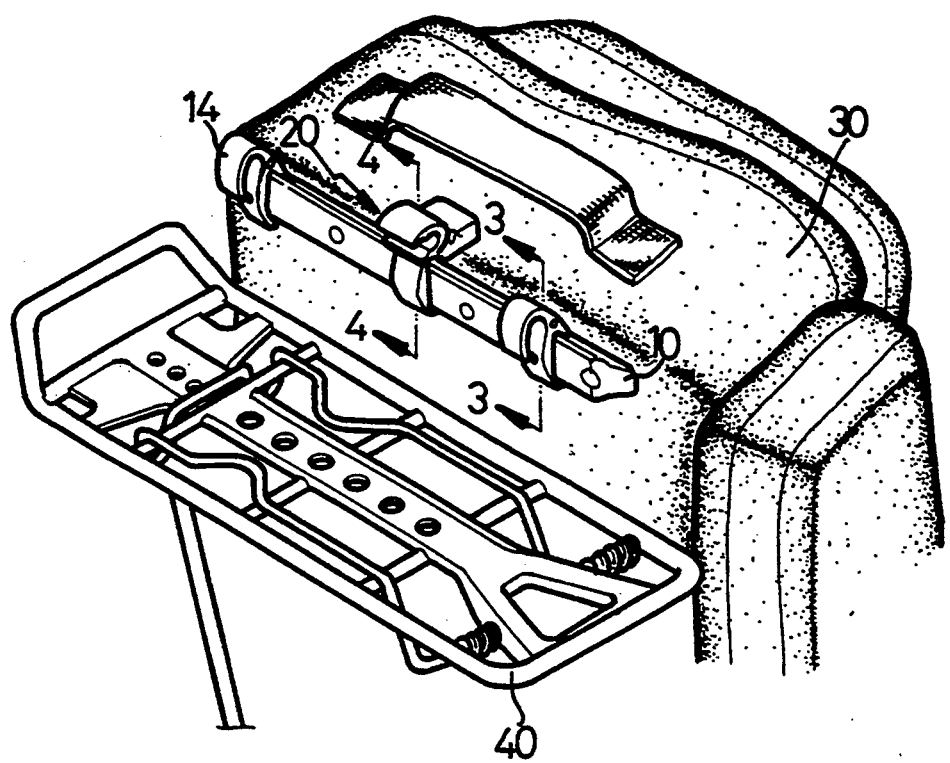
FIG. 1 is a perspective view of an article carrier for a bicycle in accordance with the present invention, illustrating the application of the article carrier.
Figure 2:
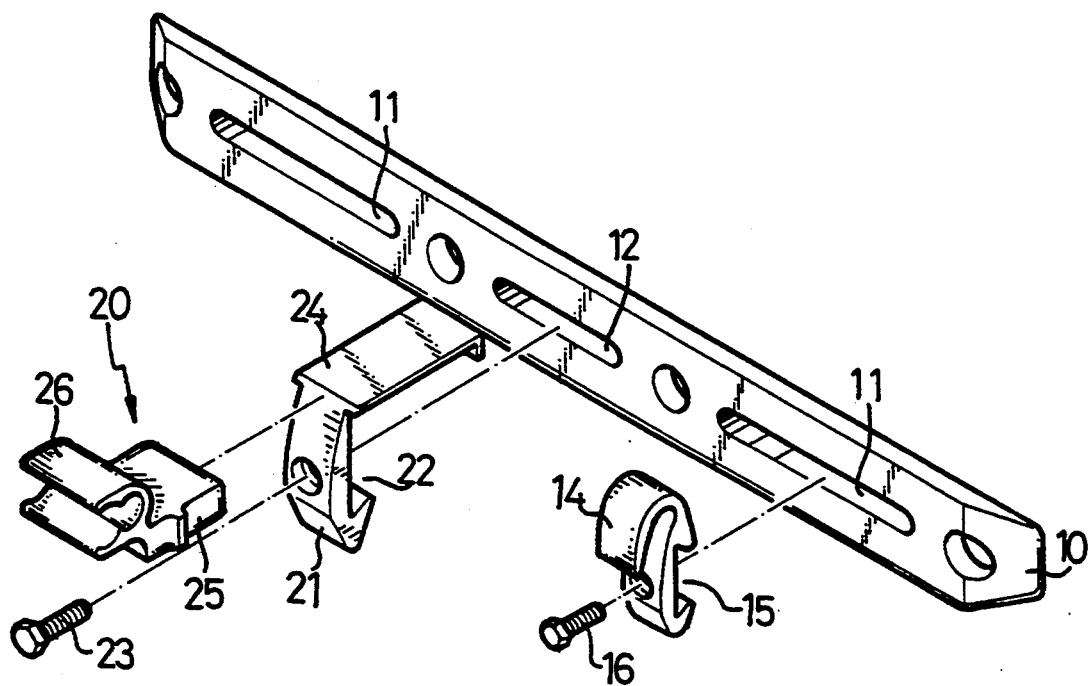
FIG. 2 is an exploded view of the article carrier.
Figure 3:
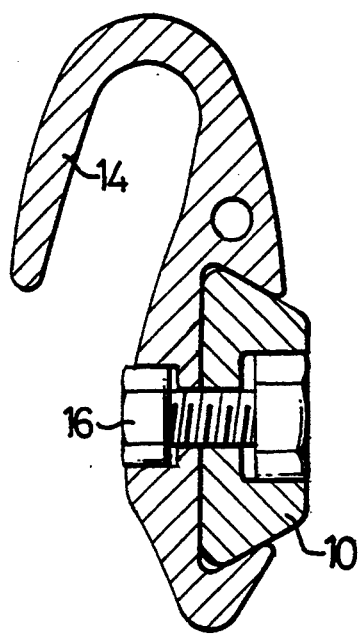
FIGS. 3 and 4 are cross sectional views taken along lines 3—3 and 4—4 of FIG. 1 respectively.

Referring to the drawings, and initially to FIGS. 1 to 3, an article carrier for a bicycle in accordance with the present invention comprises a beam 10 fixed to an article, such as a pannier 30 for attaching the pannier 30 to a bicycle carrier 40. The beam 10 includes a dove-tail shaped cross section. Three oblong holes 11, 12 are formed in the beam 10, in which a middle oblong hole 12 is formed between the other two oblong holes 11. Two hooks 14 each includes a dove-tail shaped recess 15 formed in the rear portion thereof for slidably engaging with the beam 10, a bolt 16 is engaged through the hook 14 and engaged through the oblong holes 11 for fixing the hooks 14 to the beam 10. The hooks 14 may be hooked to the rear rack 40 of the bicycle, may be hooked to the top tube of the bicycle frame, or may be hooked to the handlebar of the bicycle. The bolts 16 may be adjusted along the holes 11 for adjusting the positions of the hooks 14 on the beam 10 so as to adjust the hooks 14 to suitable positions.

Figure 4:
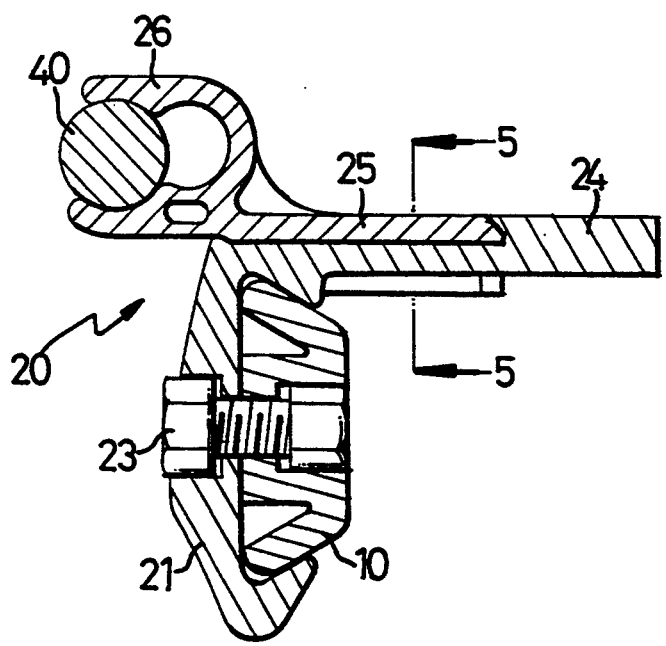
Figure 5:
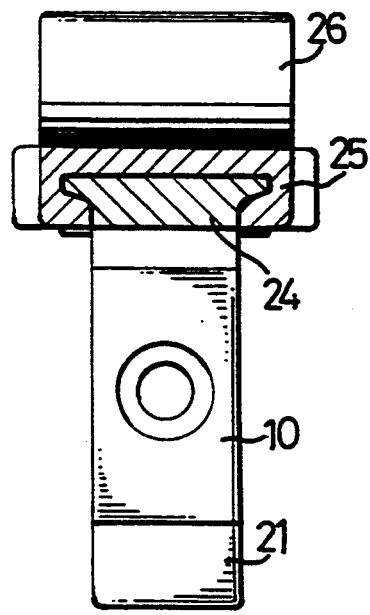
FIG. 5 is a cross sectional view taken along lines 5—5 of FIG. 4.

The article carrier further includes a retaining means 20 for further securing the beam 10 to the bicycle. The retaining means 20 includes a base 21 having a dove-tail shaped recess 22 for slidably engaging with the beam 10 and having a track 24 formed on top thereof, best shown in FIG. 5. A bolt and nut 23 may secure the base 21 to the beam 10. A slide 25 is slidably engaging with the track 24 and movable along the track 24. A retainer 26 is secured on the slide 25 for engaging with the back rack 40 of the bicycle, best shown in FIG. 4. When the retainer 26 is engaged with the back rack 40, the beam 10 is prevented from moving upward relative to the back rack 40, such that the beam 10 can be solidly secured to the back rack 40 and will not be easily disengaged from the back rack 40.

Figure 6:
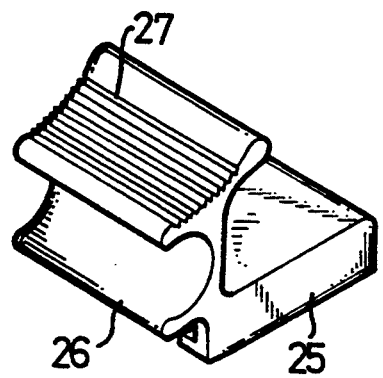
FIG. 6 is a perspective view illustrating the other type of the knob.

Referring next to FIG. 6, the retainer 26 may include a knob 27 for moving the retainer 26.

Accordingly, the article carrier may be solidly secured to the back rack, top tube or handle bar of a bicycle, such that article or pannier may be solidly attached to the bicycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for attaching an article to a bicycle carrier, said device comprising:
   a beam for fixing to said article, said beam including a dove-tail cross section and including two oblong holes formed therein,
   two hooks secured to said beam for hooking to said bicycle carrier, said hooks each including a dove-tail shaped recess formed therein for slidably engaging with said beam, and a bolt engaged through each of said hooks and said oblong holes of said beam for fixing said hooks to said beam; and
   a retaining means secured to said beam for engaging with said bicycle carrier so as to retain said beam on said bicycle carrier.

2. A carrier for attaching an article to a bicycle carrier, said device comprising:
   a beam for fixing to said article;
   two hooks secured to said beam for hooking to said bicycle carrier; and
   a retaining means secured to said beam for engaging with said bicycle carrier so as to retain said beam on said bicycle carrier, said retaining means including a base fixed on said beam, a track fixed on said base, a slide slidably engaged on said track, and a retainer secured on said slide for engaging with said bicycle carrier when said slide moves along said track, whereby, said beam is solidly secured to said bicycle.

3. The device according to claim 2, wherein said retainer includes a knob provided thereon for moving said slide.

4. The device according to claim 2, wherein said beam includes a dove-tail cross section and includes an oblong hole formed therein, said base includes a dove-tail shaped recess formed therein for slidably engaging with said beam, and a bolt engaged through said base and said oblong hole of said beam for fixing said base to said beam.

5. The device according to claim 2, wherein said track includes a dove-tail cross section, said slide includes a dove-tail shaped recess formed therein for slidably engaging with said track, such that said slide is movable along said track.

* * * * *